US011651283B1

(12) United States Patent
Liu et al.

(10) Patent No.: US 11,651,283 B1
(45) Date of Patent: May 16, 2023

(54) METHOD, PRODUCT, AND APPARATUS FOR A MACHINE LEARNING PROCESS USING DYNAMIC REARRANGEMENT OF SPARSE DATA AND CORRESPONDING WEIGHTS

(71) Applicant: Cadence Design Systems, Inc., San Jose, CA (US)

(72) Inventors: Yong Liu, Cupertino, CA (US); Ngai Ngai William Hung, San Jose, CA (US); Michael Patrick Zimmer, Chicago, IL (US)

(73) Assignee: Cadence Design Systems, Inc., San Jose, CA (US)

( * ) Notice: Subject to any disclaimer, the term of this patent is extended or adjusted under 35 U.S.C. 154(b) by 166 days.

(21) Appl. No.: 16/946,672

(22) Filed: Jun. 30, 2020

(51) Int. Cl.
*G06N 20/00* (2019.01)
*G06F 17/16* (2006.01)

(52) U.S. Cl.
CPC ............. *G06N 20/00* (2019.01); *G06F 17/16* (2013.01)

(58) Field of Classification Search
None
See application file for complete search history.

(56) References Cited

U.S. PATENT DOCUMENTS

| | | | | |
|---|---|---|---|---|
| 5,267,185 A | * | 11/1993 | Akabane | ................. G06F 17/16 708/607 |
| 7,945,528 B2 | | 5/2011 | Cytron et al. | |
| 9,128,697 B1 | | 9/2015 | Potter et al. | |
| 9,330,167 B1 | | 5/2016 | Pendar | |
| 10,643,705 B2 | | 5/2020 | Choi et al. | |
| 10,817,260 B1 | | 10/2020 | Huang et al. | |
| 2010/0306300 A1 | * | 12/2010 | Lu | ........................... G06F 17/16 708/520 |
| 2016/0342890 A1 | | 11/2016 | Young | |
| 2018/0165574 A1 | * | 6/2018 | Young | .................... G06F 17/16 |
| 2018/0307968 A1 | | 10/2018 | Bose et al. | |

(Continued)

OTHER PUBLICATIONS

Adaptive Tiling: Applying Fixed-size Systolic Arrays to Sparse Convolutional Neural Networks, Kung et al., 2018 24th International Conference on Pattern Recognition (ICPR) Beijing, China, Aug. 20-24, 2018.*

(Continued)

*Primary Examiner* — David J Stoltenberg
(74) *Attorney, Agent, or Firm* — Vista IP Law Group, LLP

(57) ABSTRACT

An approach is described for a method, product, and apparatus for a machine learning process using dynamic rearrangement of sparse data and corresponding weights. This approach includes a method, product, and apparatus for dynamically rearranging input data to move sparse data to a location such that computations on the sparse data might be avoided when executing a machine learning processing job. For example, sparse data within each row of the input matrix can be moved to the end of each corresponding row. When the input data is folded to fit the array, that sparse data might be at least partially contained within a fold that comprises only sparse data and possibly filler data. In such an event, computations on the fold are unnecessary and are avoided. In some embodiments, the approach includes dynamically rearranging a weight matrix to maintain a correspondence between the input data and the weights.

24 Claims, 12 Drawing Sheets

(56) References Cited

U.S. PATENT DOCUMENTS

| | | | |
|---|---|---|---|
| 2018/0314671 A1 | 11/2018 | Zhang et al. | |
| 2019/0012296 A1* | 1/2019 | Hsieh | G06N 3/0445 |
| 2019/0042237 A1* | 2/2019 | Azizi | G06F 17/16 |
| 2019/0236049 A1 | 8/2019 | Vantrease et al. | |
| 2019/0244086 A1 | 8/2019 | Franca-neto | |
| 2020/0097442 A1 | 3/2020 | Jacob (Yaakov) et al. | |
| 2020/0244282 A1* | 7/2020 | Bajic | H03M 7/42 |
| 2020/0410036 A1* | 12/2020 | Huynh | G06F 15/8046 |
| 2021/0035258 A1* | 2/2021 | Ray | G06N 3/08 |
| 2021/0064992 A1* | 3/2021 | Park | G06N 3/04 |
| 2021/0124794 A1* | 4/2021 | Nair | G06F 17/16 |
| 2021/0157767 A1 | 5/2021 | Ross et al. | |
| 2021/0256360 A1 | 8/2021 | Nam | |
| 2021/0271451 A1 | 9/2021 | Nair et al. | |
| 2021/0303909 A1* | 9/2021 | Gunnam | G06V 10/955 |
| 2021/0326686 A1 | 10/2021 | Abdelaziz et al. | |
| 2021/0377122 A1 | 12/2021 | Pennello | |
| 2022/0076066 A1 | 3/2022 | Forgeat et al. | |
| 2022/0129521 A1* | 4/2022 | Surti | G06F 12/0811 |

OTHER PUBLICATIONS

Non-Final Office Action dated Jul. 25, 2022 U.S. Appl. No. 16/946,673.
Notice of Allowance date Nov. 1, 2022 for U.S. Appl. No. 16/946,675.
Final Office Action dated Nov. 2, 2022 for U.S. Appl. No. 16/946,673.
Non-Final Office Action for U.S. Appl. No. 16/946,670 dated Nov. 9, 2022.
Final Office Action dated Sep. 1, 2022 for U.S. Appl. No. 16/946,671.
Shao, "Lab 2: Systolic Arrays and Dataflows", UC Berkeley, Feb. 10, 2020, pp. 1-15. Retrieved from the Internet < URL: https://inst.eecs.berkeley.edu/~ee290-2/sp20/ >.
GitHub, "Gemmini—Berkeley's Systolic Array Generator", Apr. 26, 2020, 7 pages. Retrieved from the Internet < URL: https://web.archive.org/web/20200426231646/https://github.com/ucb-bar/gemmini >.
Su et al., "A Comparison of Single-Buffer and Double-Buffer Design in a Systolic Array Generator", Journal of Physics: Conference Series 1693, Nov. 9, 2020, pp. 1-6.
Ankur6ue. (Jul. 30, 2018). Understanding Matrix Multiplication on a Weight-Stationary Systolic Architecture. Retrieved from TELESENS: http://www.telesens.co/2018/07/30/systolic-architectures/.
Brownlee, J. (Jul. 23, 2018). When to Use MLP, CNN, and RNN Neural Networks. Retrieved from Machine Learning Mastery: https://machinelearningmastery.com/when-to-use-mlp-cnn-and-rnn-neural-networks/.
So, G. (Mar. 28, 2019). Should We Abandon LSTM for CNN? Retrieved from Medium: https://medium.com/ai-ml-at-symantec/should-we-abandon-lstm-for-cnn-83accaeb93d6.
Non-Final Office Action for U.S. Appl. No. 16/946,675 dated Jun. 17, 2022.
Non-Final Office Action for U.S. Appl. No. 16/946,671 dated Mar. 2, 2022.
Yin et al., "Parana: a Parallel Neural Architecture Considering Thermal Problem of 3D Stacked Memory", IEEE Transactions on Parallel and Distributed Systems, vol. 30, No. 1, Jan. 2019, pp. 146-160.
Ahmad, S., et al., "Xilinx First 7nm Device: Versal AI Core (VC1902)," Xilinx Inc, dated Aug. 20, 2019.
Prieto, R., "Implementation of an 8-bit Dynamic Fixed-Point Convolutional Neural Network for Human Sign Language Recognition on a Xilinx FPGA Board," Department of Electrical and Information Technology Lund University, dated Mar. 17, 2019.
Jawandhiya, P "Hardware Design for Machine Learning," International Journal of Artificial Intelligence and Applications (IJAIA), vol. 9, No. 1, dated Jan. 2018.
"Dell EMC Ready Solutions for AI—Deep Learning with Intel," Measuring performance and capability of deep learning use cases, Dell EMC, dated Jun. 2019.
Mayannavar, S., et al., "Hardware Accelerators for Neural Processing," International Journal of Computer Information Systems and Industrial Management Applications, ISSN 2150-7988 vol. 11 (2019) pp. 046-054, dated Apr. 17, 2019.
Non-Final Office Action dated Oct. 3, 2022 for U.S. Appl. No. 16/946,674.
Notice of Allowance for U.S. Appl. No. 16/946,673 dated Feb. 1, 2023.
Notice of Allowance for U.S. Appl. No. 16/946,674 dated Feb. 2, 2023.
Yin et al., "A High Energy Efficient Reconfigurable Hybrid Neural Network Processor for Deep Learning Applications", Dec. 2017, pp. 968-982 (Year: 2017).

* cited by examiner

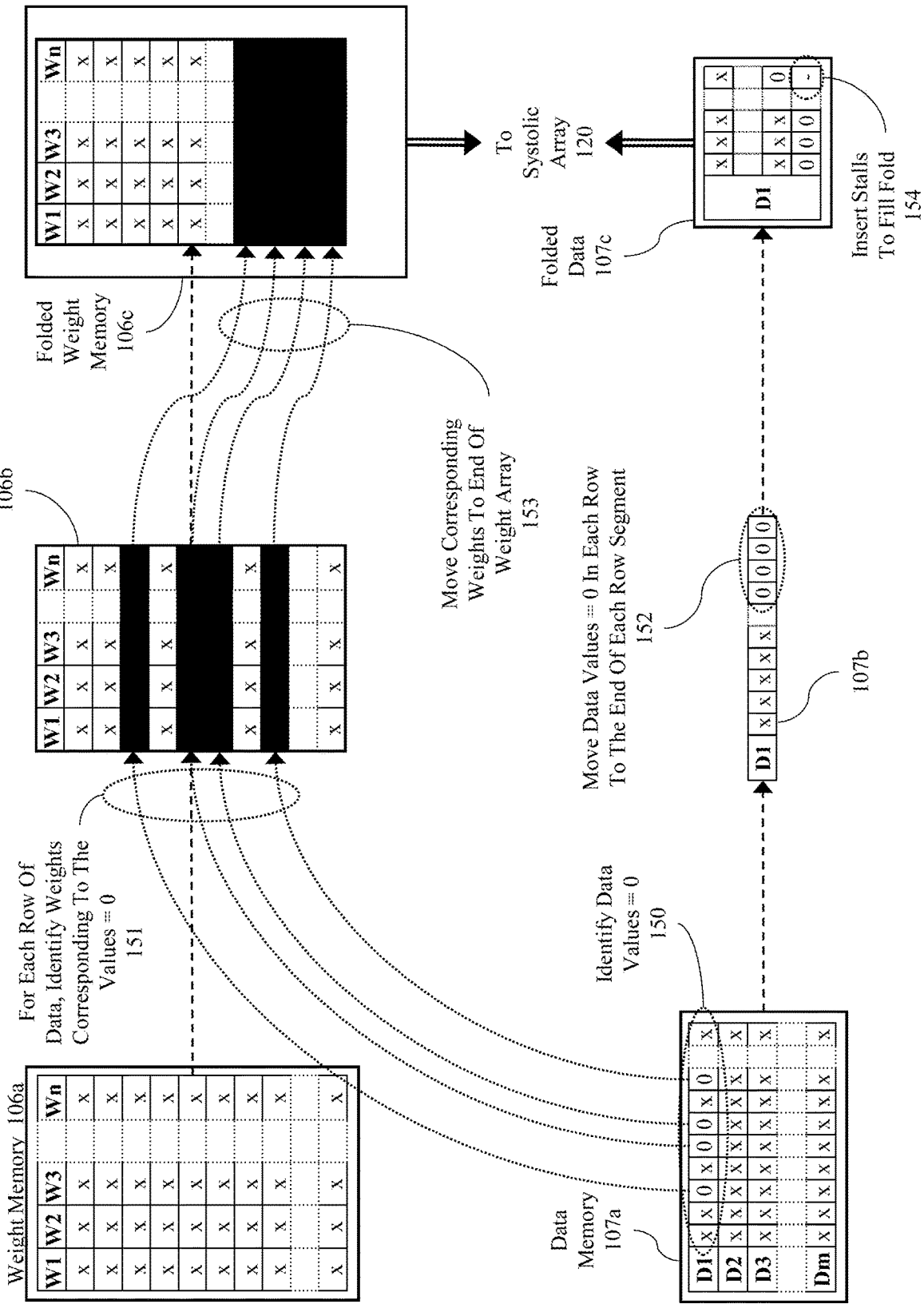

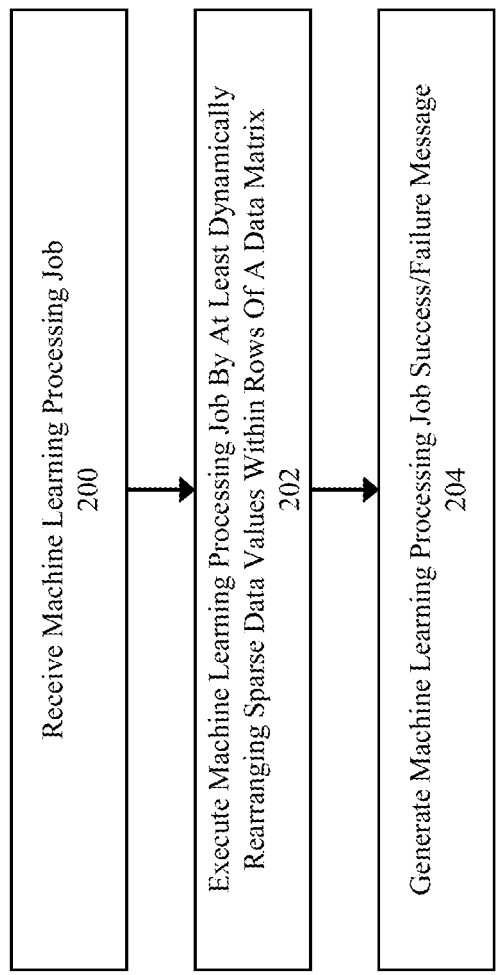

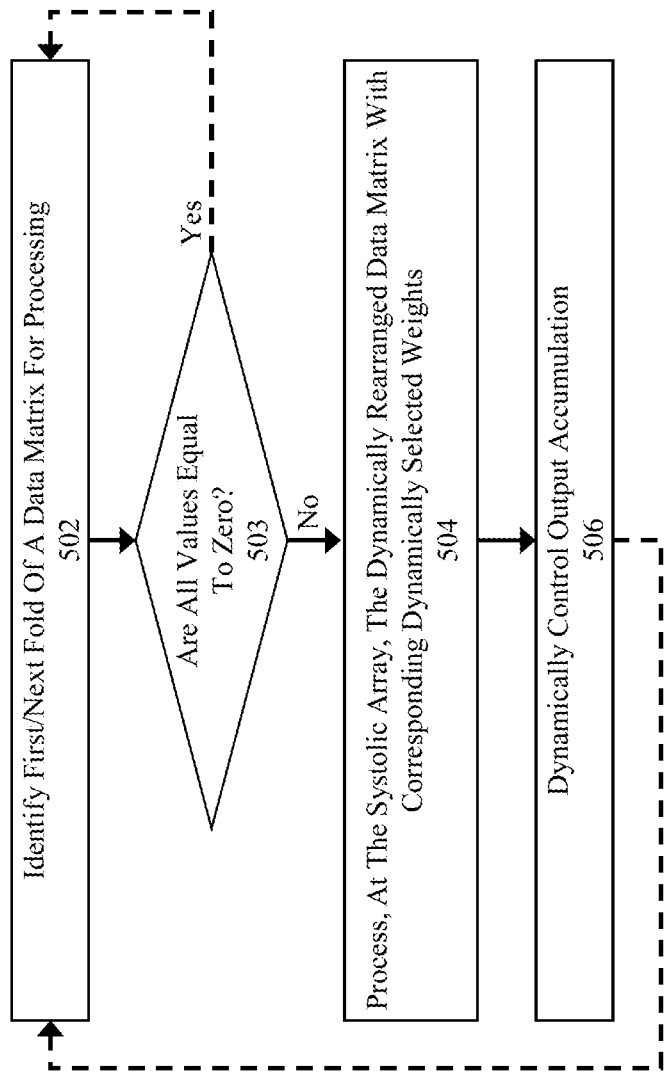

METHOD, PRODUCT, AND APPARATUS FOR A MACHINE LEARNING PROCESS USING DYNAMIC REARRANGEMENT OF SPARSE DATA AND CORRESPONDING WEIGHTS

RELATED APPLICATIONS

The present application is related to co-pending U.S. patent application Ser. No. 16/946,674 titled "METHOD, PRODUCT, AND APPARATUS FOR A MULTIDIMENSIONAL PROCESSING ARRAY FOR HARDWARE ACCELERATION OF CONVOLUTIONAL NEURAL NETWORK INFERENCE", U.S. patent application Ser. No. 16/946,675 titled "METHOD, PRODUCT, AND APPARATUS FOR VARIABLE PRECISION WEIGHT MANAGEMENT FOR NEURAL NETWORKS", U.S. patent application Ser. No. 16/946,673 titled "METHOD, PRODUCT, AND APPARATUS FOR A MACHINE LEARNING PROCESS LEVERAGING INPUT SPARSITY ON A PIXEL BY PIXEL BASIS", U.S. patent application Ser. No. 16/946,671 titled "METHOD, PRODUCT, AND APPARATUS FOR A MACHINE LEARNING PROCESS USING A SYSTOLIC ARRAY WITH MULTIMODAL WEIGHT MANAGEMENT", U.S. patent application Ser. No. 16/946,670 titled "METHOD, PRODUCT, AND APPARATUS FOR A MACHINE LEARNING PROCESS USING WEIGHT SHARING WITHIN A SYSTOLIC ARRAY HAVING REDUCED MEMORY BANDWIDTH" filed on even date herewith, which are hereby incorporated by reference in their entirety.

FIELD

This disclosure pertains to machine learning processing.

BACKGROUND

The increase of the computing capacity of computing devices and the interconnection of those devices has enabled multiple uses for artificial intelligence. For instance, artificial intelligence can now be found in digital personal assistants and various informational websites. Additionally, artificial intelligence has seen substantial use in image processing fields, such as in recognition of objects (e.g., an AI system in a car recognizing a pedestrian) and other types of image processing.

Various types of techniques have been employed to implement AI and machine learning. For example, one particularly dominant approach to AI is the processing of data using neural networks such as those used in deep learning techniques. Neural networks generally comprise a logical collection of logical nodes connected to other nodes by one or more weighted connections. These logical nodes are arranged in logical layers where each node is associated with the performance of the same type of operations and a plurality of nodes are provided in each convolution layer. For instance, one common type of operation used for convolutional neural networks are multiply accumulate operations.

However, the data matrix for these operations is often sparse where a significant amount of input values are equal to zero. The values in the data matrix are sent to the systolic array for processing regardless of the fact that these multiplication by zero operations and accumulations have no effect of the results output from the systolic array. This is essentially wasted effort. Furthermore, activation functions used in machine learning operations often result in the creation of values equal to zero, which in turn may result in more operations that are essentially wasted effort.

Thus, what is needed is an improved method, product, and apparatus for decreasing the amount of wasted operations executed for machine learning processing.

SUMMARY

Embodiments of the present invention provide an approach for a method, product, and apparatus for a machine learning process using dynamic rearrangement of sparse data and corresponding weights.

This approach includes a method, product, and apparatus for dynamically rearranging input data to move sparse data to a location such that computations on the sparse data might be avoided when executing a machine learning processing job. For example, sparse data within each row of the input matrix can be moved to the end of each corresponding row. When the input data is folded to fit the array, that sparse data might be at least partially contained within a fold that comprises only sparse data and possible filler data. In such an event, computations on the fold are unnecessary and are avoided. In some embodiments, the approach includes dynamically rearranging a weight matrix to maintain a correspondence between the input data and the weights for a trained convolutional neural network.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

FIG. 1A depicts an example flow of an approach for a machine learning process using dynamic rearrangement of sparse data and corresponding weights according to some embodiments.

FIG. 2 illustrates a flow for processing machine learning jobs using dynamic rearrangement of sparse data according to some embodiments.

FIG. 5 illustrates an example approach to managing the flow of folded data where folds that comprise only zero values are skipped according to some embodiments.

DETAILED DESCRIPTION

Figure 1B:
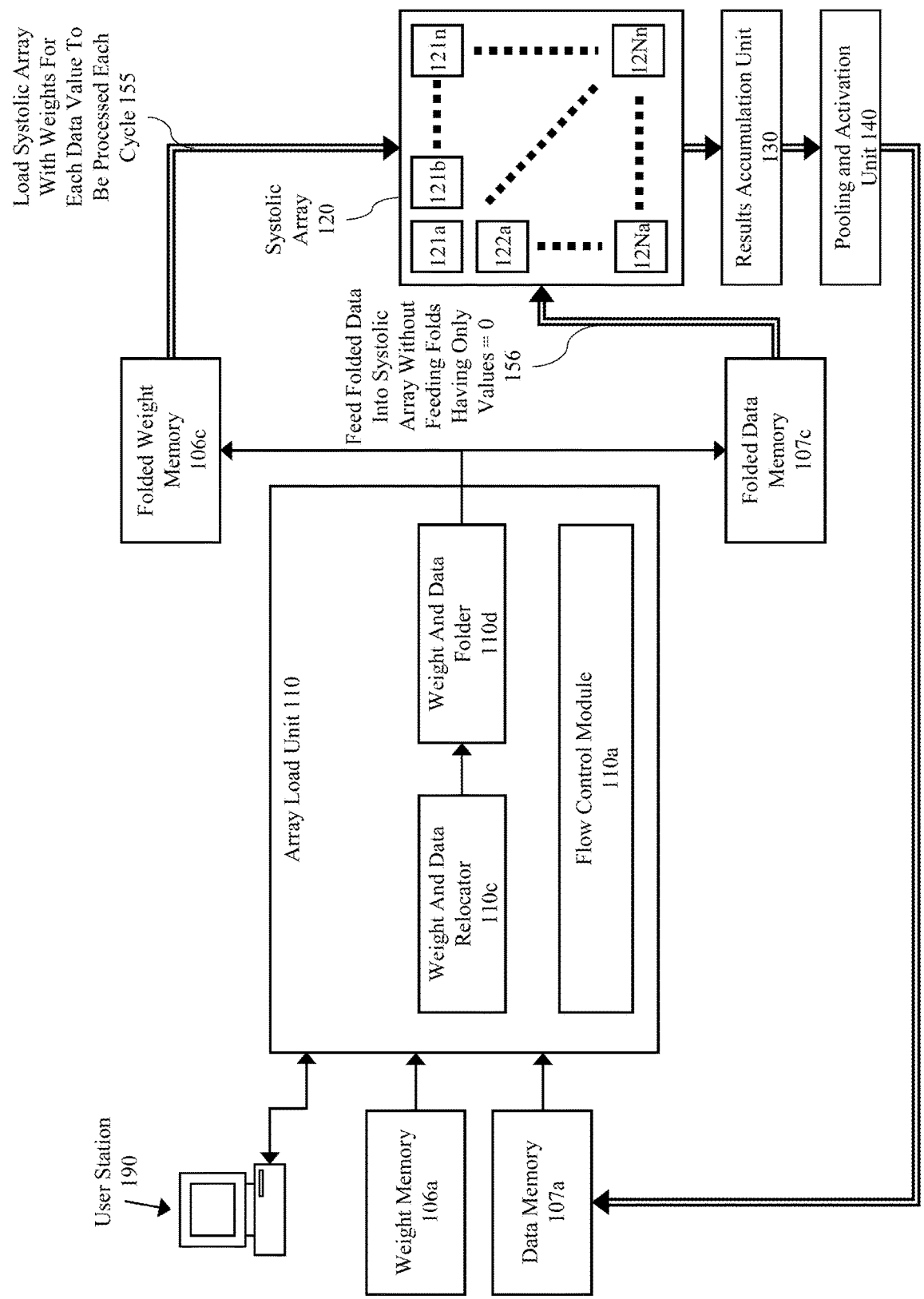
FIG. 1B depicts an example system that implements machine learning process using dynamic rearrangement of sparse data and corresponding weights according to some embodiments.

Embodiments of the present invention provide an approach for a method, product, and apparatus for a machine learning process using dynamic rearrangement of sparse data and corresponding weights.

Generally, machine learning models such as convolutional neural networks comprise a plurality of nodes that are connected nodes in a different layer by a weight. This weight is used as the multiplier against corresponding input data. For example, a systolic array is often used to perform the convolutions by executing a set of multiply and accumulate operations. These operations are implemented to compute the dot product for each row in an input matrix and each corresponding column in the weight matrix. However, multiplication by zero in this context is essentially wasted effort because the result of the accumulation of a partial sum with zero is the very same partial sum without change.

The approach disclosed herein and described in at least FIG. 1A. below may avoid some of the operations to multiply and accumulate sparse data.

FIG. 1A depicts an example flow of an approach for a machine learning process using dynamic rearrangement of sparse data and corresponding weights according to some embodiments. Generally, the approach includes identification of data values equal to zero and then relocation of those data values and corresponding weights to the end of a corresponding segment.

Data memory 107a as illustrated here comprises an array of data organized into a plurality of rows—see D1-Dm. Similarly, weight memory 106a includes an array of weights where each piece of data corresponds to a row in the weight matrix.

As illustrated the approach includes identification of data values equal to zero at 150. For example, as illustrated in the row labeled D1, at least the third, fifth, sixth, and eighth values are equal to zero. These values correspond to different rows in the weight matrix stored in the weight memory. For example, at 151 the rows in the weight matrix that correspond to the data values are identified. These corresponding rows are illustrated at 106b as the blacked-out rows.

Additionally, the values in the data row (107b) that are equal to zero are moved to the end of that row at 152. Subsequently, the data matrix and weight matrix can be folded, if necessary, to fit the data within a processing arrangement (e.g., systolic array 120). For instance, the data for each row might be folded into some number of folds (see e.g., folded data 107c), and a corresponding portion of the weight matrix might also be represented in a folded weight memory 106c. As shown in the illustration the weights that correspond to the data values equal to zero are represented at the end of a fold of the weight matrix. Similarly, the row of data may also be folded where data values that are equal to zero are justified to the end of all fold as a group.

As a result, when a fold is entirely filled with data values equal to zero and/or stalls (such as those inserted at 154) that fold does not need to be processed with the systolic array as the result of that processing would cause zero change to the sum or dot product being computed. In some embodiments, folds that comprise only zero values or stalls identified during the fold generation process and may be either discarded or not generated in the first place—e.g., by identifying a fold that ends in a data value equal to zero or a fold that would start with a data value equal to zero. Additionally, the folded weight memory might comprise the full weight matrix and a selection of rows that should be either skipped or included for a particular corresponding data fold. In some embodiments, folded weights might be generated for each data fold. Additionally, because zero times something is always zero, the actual weights corresponding to the data values that are equal to zero do not actually need to be the weights that originally corresponded to the data values equal to zero. Instead, in some embodiments, the weights corresponding to the zero values as represented in the folded weight memory state merely comprise a default value such as zero or one.

FIG. 1B depicts an example system that implements machine learning process using dynamic rearrangement of sparse data and corresponding weights according to some embodiments. Generally, the system executes machine learning processing jobs using an approach that identifies and, in some case, removes data values equal to zero from the processing flow. In this way, the approach illustrated here saves processing cycles of a processing arrangement (e.g., a systolic array) and saves power consumption by avoiding the execution of operations that perform no useful function.

The system as illustrated includes multiple components including a weight memory 106a, data memory 107a, an array load unit 110, a folded weight memory 106c, a folded data memory 107c, a systolic array 120, a results accumulation unit 130, a pooling and activation unit 140, and a user station 190. In some embodiments, all of items 106a, 107a, 110, 106c, 107c, 120, 130, 140 included as separate physical elements. However, in some embodiments similar elements might be combined, such and with memory 106a, data memory 107a, folded weight memory 106c, folded data memory 107c (such as in the same underlying physical memory), or results accumulation unit 130 with pooling an activation unit 140.

The array load unit 110 may receive a machine learning processing job from a user station 190. The user station 190 comprises any type of computing station that is useable to operate or interface with a database or other computing device, such as one that might store, perhaps temporarily, or have a machine learning processing job. Examples of such user stations include workstations, personal computers, phones, tablets, or remote computing terminals. In some embodiments, the user station 190 comprises a display device, such as a display monitor, for displaying a user interface to users at the user station. The user station 190 also comprises one or more input devices for the user to provide operational control over the user station, such as a mouse, keyboard, or touch screen to manipulate a graphical user interface from which a user input might be received.

The weight memory 106a comprises a storage location for weights corresponding to data. Similarly, the data memory 107a comprises a storage location for data that is associated with those weights. The memory 106a and 107a might be separate or might be combined in a single structure. In some embodiments, the memory for 106a and 107a whether separately or combined might be provided with multiple read and/or write ports. The weight memory 106a and data memory 107a may be populated with the necessary data to execute a machine learning processing job using any relevant technique as is known in the art.

Array load unit 110 includes an element for weight and data relocation at 110c, an element to fold weights and data to fit within a systolic array at 110d, and a flow control module 110a. Generally, the array load unit executes the approach illustrated in FIG. 1A. In particular, the array load unit will identify data values equal to zero, identify corresponding rows in the weight matrix, and manage the flow of processing using a systolic array.

The weight and data relocator 110c identifies the data values that are equal to zero on a row by row basis. Additionally, the weight and data relocator 110c will determine the rows in the weight matrix that correspond to the data values that are equal to zero and relocate those weights in a corresponding manner. Generally, for a machine learning processing job each data value will correspond to one or more weights which may in turn correspond to channels. These weights are used in a systolic array (e.g., systolic array 120) for multiply and accumulate operations at processing elements (e.g., 121a-12Nn) within the array. For example, a data value is multiplied by one or more weights in one or more multiply accumulate operations—e.g., data value X is multiplied by a first corresponding weight and accumulated with a result from a previous multiply and accumulate operation. The result of the multiply and accumulate operation is then passed down to the next portion (e.g., row) in the systolic array for accumulation as part of a subsequent multiply and accumulate operation. Eventually, the accumulated results will be passed through the array and output for a next phase of the machine learning processing job—such as for processing in a subsequent convolution layer of a trained neural network. However, for a data value that is equal to zero the result of the multiplication of the data value times the weigh would be equal to zero and the accumulation would be equal to the previous result. Essentially the multiply and accumulate operation that includes a data value equal to zero passes the previous result to a next processing element within a systolic array. To address this issue the weight and data relocator will essentially relocate those data values that are equal to zero and the corresponding weights to an extremum of a logical set of data. For instance, the data values equal to zero might be moved to the end or beginning of a row of data. Additionally, the corresponding rows in the weight matrix would also be moved in the same way. In some embodiments, the data and weights are actually moved. However, other approaches could be used. For example. A list of data values equal to, or not equal to, zero and corresponding weights could be generated. This list could then be used to generate/identify relevant data on the fly. Additionally, a list could be maintained to reconstruct the original order of data after some processing (e.g., processing using a systolic array to execute a plurality of multiply and accumulate operations.

The weight and data folder 110d will use the representation of the data and the corresponding weights that are generated to create sets of folded data and weights as appropriate for processing by the systolic array. For example, if the weight and data relocator 110c actually generates matrixes of data and weights with the data and weight relocated, the weight and data folder 110d might merely break up the data and the weights into sets that would fit into the systolic array on a row by row basis. On the other hand, the weight and data folder 110d could generate the data and weight folds on the fly using the original data and weights stored in the data memory 107a and weight memory 106a and the list of values equal to, or not equal to, zero. In some embodiments, folded weight memory 106c and folded data memory 107c are not provided. Instead, the array load unit 110 will feed data into the systolic array that is dynamically selected. In some embodiments, the weight and data folder will pad any sets of weights and data that do not correspond to the size of the systolic array or an active portion thereof. The padding might comprise any one or more of data values equal to zero, stalls, weights equal to zero, weights equal to a default value, weights that are otherwise random, or weights that were previously in the rows corresponding to the data value equal to zero. In some embodiments, if a fold that is otherwise to be generated would include data values that are only equal to zero and/or stalls, the weight and data folder 110d will selectively skip the creation of that fold.

In some embodiments, the flow control module 110a controls the operation of the weight and data relocator 110c, the weight and data folder 110d, and the flow of data into the systolic array. The flow control module 110a controls the flow of data into and out of the array load unit, and further controls the flow of data into the systolic array. In some embodiments, the flow control module 110a controls restoration of the order of data output by the systolic array. For instance, the flow control module 110a specifies where data values equal to zero should be inserted back into the output of the systolic array to restore the ordering of that data. One possible approach includes using the results accumulation unit 130 to insert zeros into the results at any appropriate locations.

The systolic array 120 comprises an array of processing elements where each processing element may be connected to an edge of the systolic array and/or a neighboring processing element. For example, As illustrated, the systolic array 120 comprises 1-N rows and a-n columns where each row and column intersection corresponds to a processing element. In some embodiments, the number of rows is equal to the number of columns such that each row has the same number of processing elements as each column. Thus, the systolic array 120 includes 121a-12Nn processing elements.

The systolic array 120 receives the reordered data and weights at 156 and 155 respectively. Generally, once the ordering of the data and corresponding weights have been changed to move the values equal to zero to an extremum (e.g., the beginning or end of a set of folds) that data can be fed into the systolic array as would normally occur. Generally, the systolic array will receive weights along one dimension (e.g., at the beginning of each column and passed through each processing element within the column) and data along another direction (e.g., at the beginning of each row and passed through each processing element within the row). These data and weights will be passed through the array where each processing element (e.g., 121a-12Nn) multiplies received data by a received weight and accumulates that result with a partial sum from a previous element, until the result of the first dimension (the weight dimension) are output at the last active processing element in the first dimension. In this way, each of the rows or columns in the first dimension correspond to an output channel for a particular row of input data.

The output of the systolic array is captured at the results accumulation unit 130. In some embodiments this comprises at least temporarily storing the results from the systolic array. In some embodiments, the results are stored in a memory (e.g., data memory 107a) for further processing. Additionally, as discussed previously, the results accumulation unit 130 might restore the order of the results by inserting values equal to zero at locations corresponding to those in the original set of data. For example, the flow control module 110a might provide data, control signals, and/or instructions indicating where zero values should be inserted into the data. In this way, the results accumulation unit 130 will maintain the positional relationship between the data and the weights.

The pooling and activation unit 140 will execute any pooling and activation functions on the results of the systolic array. Pooling has multiple different variants that are generally directed towards combining values. For example, pooling can comprise any combination of max/average operations on a 2×2, 3×3, etc., set of data with any number of different strides. Additionally, one or more activation functions might be utilized on the data—e.g., ReLu, ReLu6, Tanh, Sigmoid, and element wise operations on the results generated by the systolic array. As a result of the execution of an activation function, many more data values might be converted to zero. Thus, as each convolutional layer is processed, the resulting data might contain numerous data values equal to zero. These values may then be processed in a subsequent layer of a machine learning model, including the processes discussed herein for data relocation and processing. In some embodiments, the results from the pooling and activation unit are stored in and/or read from the data memory 107a.

FIG. 2 illustrates a flow for processing machine learning jobs using dynamic rearrangement of sparse data according to some embodiments. Generally, the process starts when a machine learning processing job is received. The machine learning processing job is then executed using the dynamic rearranging of data as discussed herein. Finally, a message indicating success or failure is generated.

The process starts at 200 where a machine learning processing job is received. The machine learning processing job might be received from a user device (e.g., user station 190) either directly or indirectly. For example, the user station 190 might comprise an image or set of images for processing to perform an inference task. For instance, a previously defined neural network model might be represented by a plurality of layers having a specific configuration of weights. A processing job might comprise an image to be processed with a particular trained neural network to determine if the image is of the thing or type of thing the neural network was trained on.

At 202 the machine learning process is executed by at least dynamically rearranging sparse data values within rows of a data matrix. This will be discussed further below. Briefly, the process will identify data values that are equal to zero and corresponding weights. The data values and weights are then relocated on a data row by data row basis to an extremum for each respective data row. Subsequently, at least the data values and the corresponding weights that are not equal to zero are processed, where folds or sets of data that do not contain data values that are not equal to zero may be skipped entirely.

At 206 a machine learning processing job success/failure message is generated. In some embodiments, the message comprises and a direct indication that the processing job was completed successfully or that the processing job failed. In some embodiments, a success message is represented by a message that moves or provides the result(s) of the machine learning processing job or indicates that the results of the machine learning processing job are ready/available.

Figure 3:
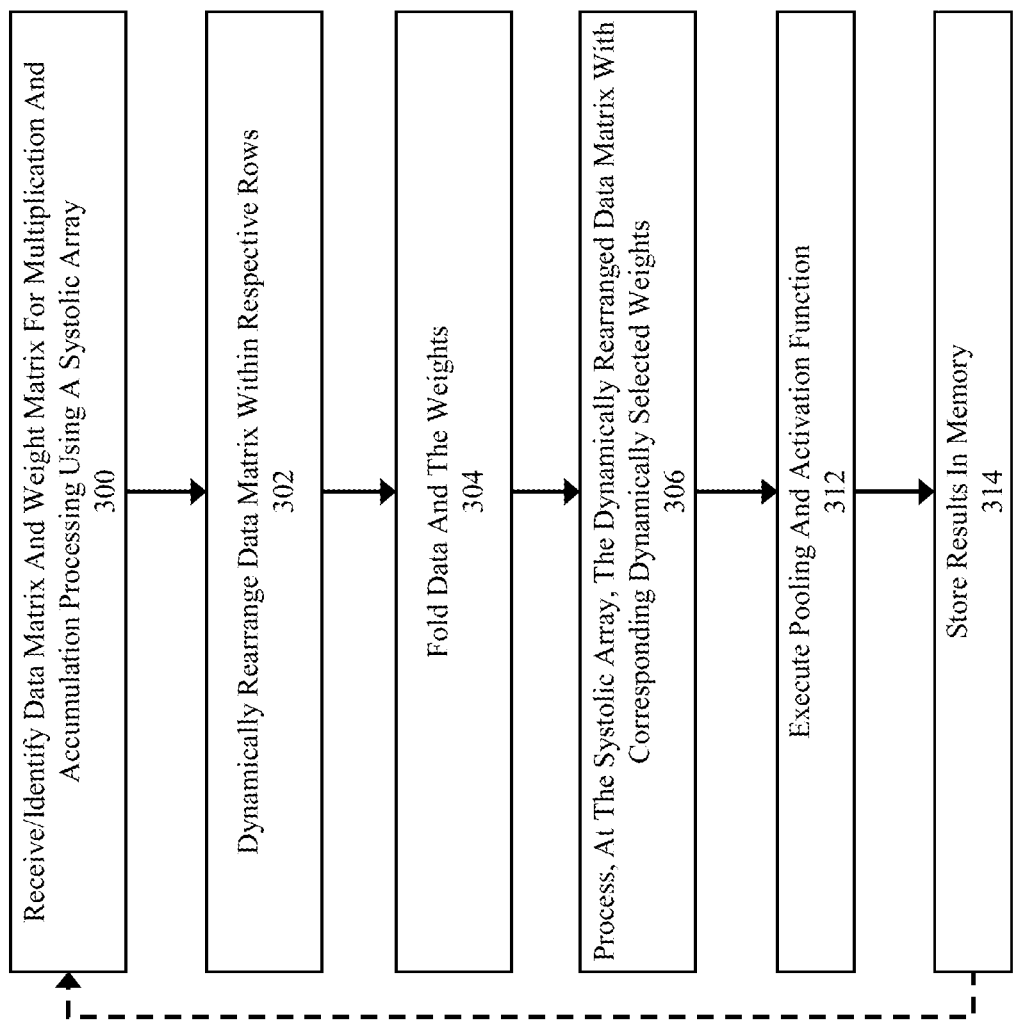
FIG. 3 illustrates an example process flow corresponding to the block titled execute machine learning processing job by at least dynamically rearranging sparse data values within rows of a data matrix as illustrated in FIG. 2 according to some embodiments.

FIG. 3 illustrates an example process flow corresponding to the block titled execute machine learning processing job by at least dynamically rearranging sparse data values within rows of a data matrix as illustrated in FIG. 2 according to some embodiments. Generally, the process is implemented using a dynamic approach because the relevant information (e.g., data values equal to zero) will be different for each machine learning processing job and will be different as they pass through different layers of a trained machine learning model.

At 300, a data matrix and corresponding weight matrix is received/identified for multiplication and accumulation processing using a systolic array. For example, the machine learning processing job might specify a location of a data matrix and a weight matrix that is pending processing (e.g., in data memory 107a and weight memory 106a).

At 302 the data matrix is dynamically rearranged within respective rows. As discussed previously, this comprises logically moving data values equal to zero and corresponding weights to an extremum within a row (e.g., to the beginning or end of a row). This process is discussed further at least in regard to FIG. 4.

In some embodiments, the data and weights are folded at 304 to match the size of a systolic array that is to be used for processing the data and weights. Furthermore, as discussed herein, folds that comprise or would comprise only data that is equal to zero or corresponds to a stall operation may be excluded from the set of to be processed data and weights by either not creating those folds or by not issuing those folds to a systolic array.

At 306 the dynamically rearranged data and corresponding weights are processed on a row by row basis. As discussed herein, this generally comprises executing a plurality of multiply and accumulate operations where the data values are multiplied by corresponding weights and the results are accumulated across a dimension of the systolic array.

In some embodiments, pooling and activation functions are executed at 312. As previously discussed, the pooling and activation functions might result in multiple data values equal to zero. These values may be stored in a memory at 314 before being processed again to implement a subsequent layer of a trained machine learning model.

Figure 4:
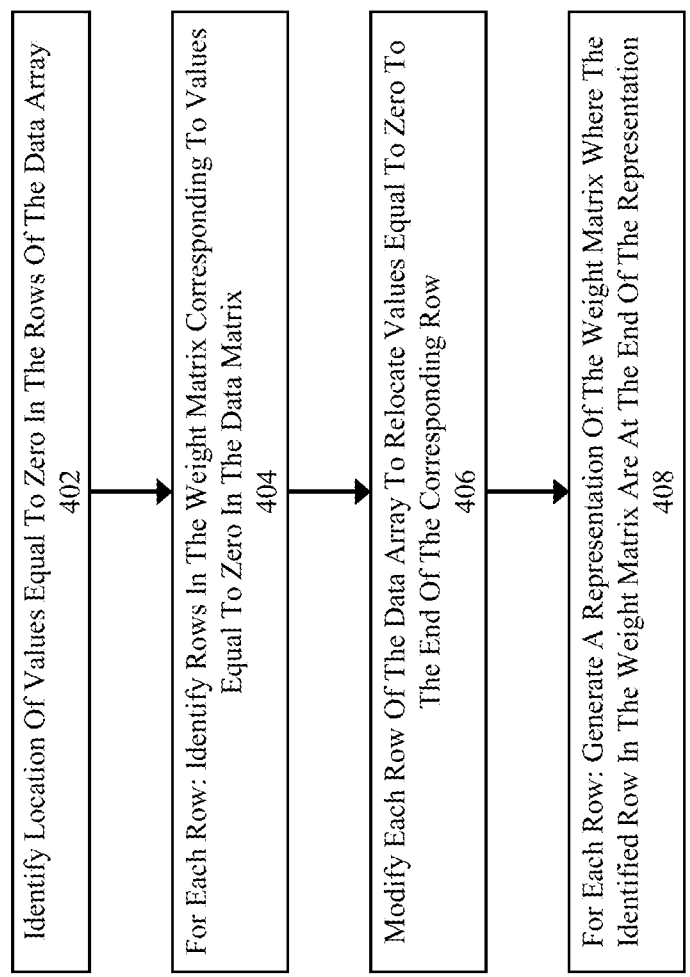
FIG. 4 illustrates an example process flow corresponding to the block titled dynamically rearrange data matrix within respective rows illustrated in FIG. 3 according to some embodiments.

FIG. 4 illustrates an example process flow corresponding to the block titled dynamically rearrange data matrix within respective rows illustrated in FIG. 3 according to some embodiments. As provided in this example, each row of data will be processed to identify data values equal to zero, and those data values will be moved to the end of the row in which they were found.

At 402, the locations of data values equal to zero are identified in each row. For example, a list of offsets might be generated for each row, where those offsets can be used to reference the locations of those data values equal to zero.

At 404, rows in the weight matrix that corresponded to a data values equal to zero in each data row are identified. For example, the list of offsets for each respective row are used as or for identifying the weights that correspond to those data values. Generally, each data row has a plurality of data items. Those data items each correspond to a row in the weight matrix. Thus, if the list comprises a set of offsets then that list of offsets can be used to reference the weights that correspond to those data items or to generate such a list. For example, each offset can be adjusted to account for size differences between weights and data items if used as memory offsets. In one embodiment, the data items are 32-bits whereas the weights are 8-bits. In this case, the offsets might each be divided by 4 to generate a list of offsets that identify rows in the weight matrix that correspond to those data values equal to zero.

At 406, each row of data in the data array is modified to relocate values equal to zero to the end of the corresponding row. For example, for each row of data values, the values that are not equal to zero are sorted such that data values equal to zero are moved to or recreated at the end of the row. In some embodiments, this may be combined with a folding process to dynamically generated folded data for processing by a systolic array. At 408, the process is repeated for the weight matrix. For example, for each fold of data from a particular row, a weight matrix fold is created that comprises only the corresponding rows of the weight matrix, with the rows corresponding to data values equal to zero being omitted or relocated to the end of the folds as with the data values.

FIG. 5 illustrates an example approach to managing the flow of folded data where folds that comprise only values equal to zero and possibly stalls are skipped according to some embodiments. The approach illustrated herein analyzes folded data to determine if the folded data has any values that are not equal to zero. Using this information, the process avoids processing folds that comprise only data values equal to zero.

At 502, a first/next set of a fold of a data matrix is identified for processing. This data in the fold is then analyzed at 503 to determine whether the fold has any data values that are not equal to zero and/or comprises only stalls, or some combination thereof. If the result of this determination is in the affirmative, then the process returns to 502 where a next fold is selected because the fold does not need to be processed. The next fold is selected, such as a first fold of a different row. If the answer to this is the negative, then the fold has data that should be processed using a systolic array.

Any folds that are identified as having data to be processed are input into a systolic array at 504 for processing of the dynamically rearranged data matrix as represented by a respective fold. At 506, the output of the systolic array is processed to dynamically control how the accumulated output from the systolic array is represented. For example, as discussed above, data values equal to zero may be reinserted into the systolic array at locations corresponding to where they were originally identified. Subsequently the process may return to 502 to identify a new fold to be processed.

In some embodiments, the data for a fold is analyzed prior to generation of a fold to determine if the fold would comprise only values equal to zero and/or stalls. In such an event, the approach might determine that the fold will not need to be processed and thus not generate the fold in the first place.

FIGS. 6A-D provide an illustrative example of dynamically rearranging sparse data within rows and corresponding weights according to some embodiments. In particular, the example shows three rows and data and corresponding weights in a weight matrix and how the data matrix and weight matrix correspond to sets of data and weights that have been dynamically folded according to some embodiments.

Figure 6A:
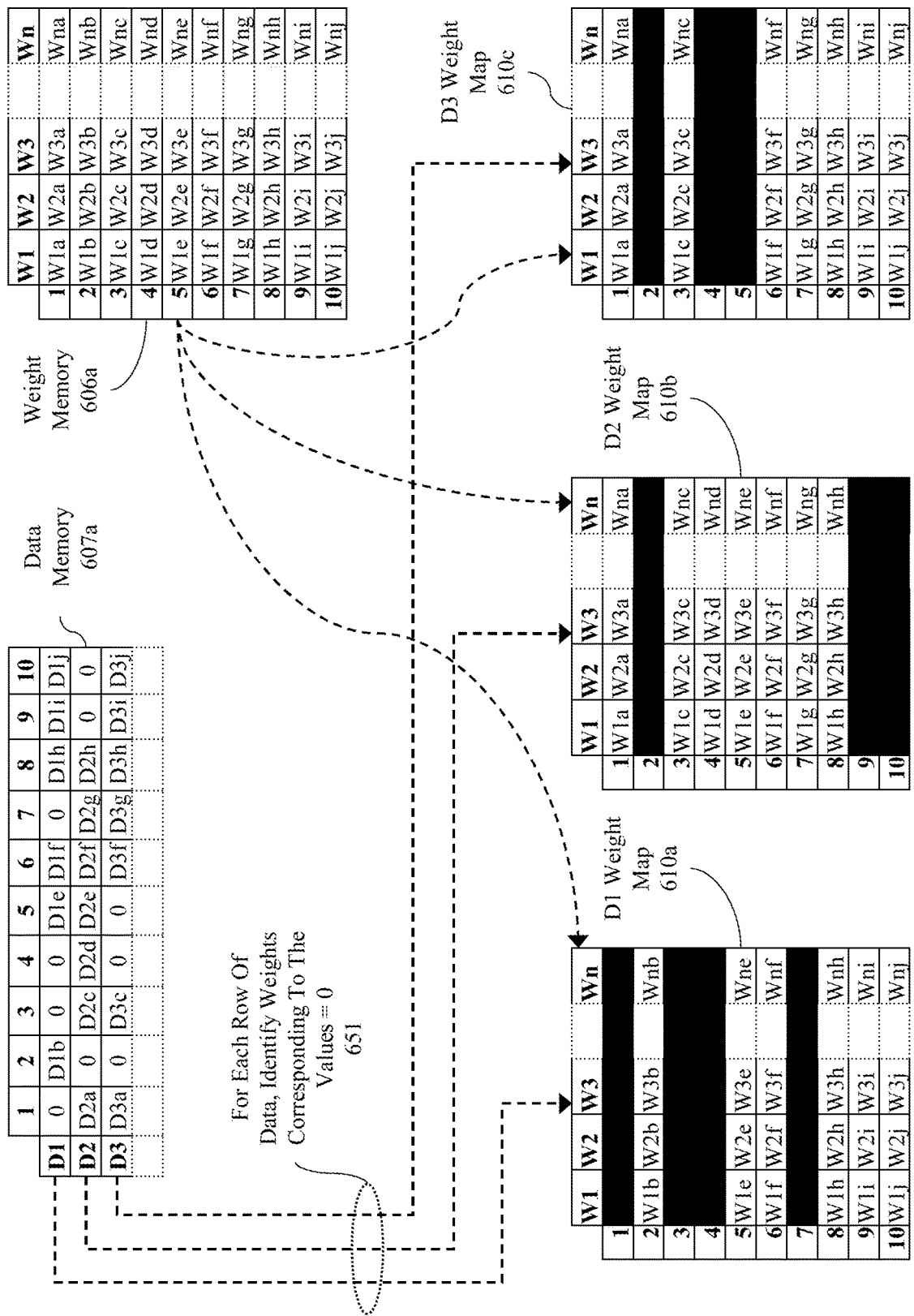
FIGS. 6A-D provide an illustrative example of dynamically rearranging sparse data within rows and corresponding weights according to some embodiments.

FIG. 6A illustrates the data matrix, the weight matrix, and the correspondence of the data values to the rows of the weight matrix.

To illustrate, data memory 607*a* contains the shown data matrix having at least three rows of data (D1-D3). Weight memory 606*a* contains a weight matrix having a number of rows equal to the number of data items in each row of the data matrix. The values in the data matrix are represented by zeros when equal to zero or by a row identifier and a letter when the values are not equal to zero (see e.g., D1*b*, D1*e*, D1*f*, D1*h*, D1*i*, and D1*j*). similarly, the weights in each column are identified by a column identifier and a letter (see e.g., W1*a-j*). Data memory 607*a* corresponds to data memory 107*a* and thus the description of data memory 107*a* applies to 607*a*. Similarly, weight memory 606*a* corresponds to weight memory 106*a* and thus the description of weight memory 106*a* applies to 606*a*.

As illustrated at 651, for each row of data, the rows of the weight matrix that correspond to data values equal to zero are identified. For the first row (D1) the identification of the rows is represented by the blacked-out rows in the D1 weight map 610*a*. Similarly, for rows D2 and D3, the weight maps are identified at 610*b* and 610*c* where the blacked-out rows correspond to the data values equal to zero. As can be seen from the illustration, each of the weight maps 610*a-c* are generated from the same weight matrix but exist as separate representations. These representations might comprise full populated matrixes as illustrated here or might comprise a specification of a number of a selections and/or a number of modifications to the weight matrix in 606*a*.

Figure 6B:
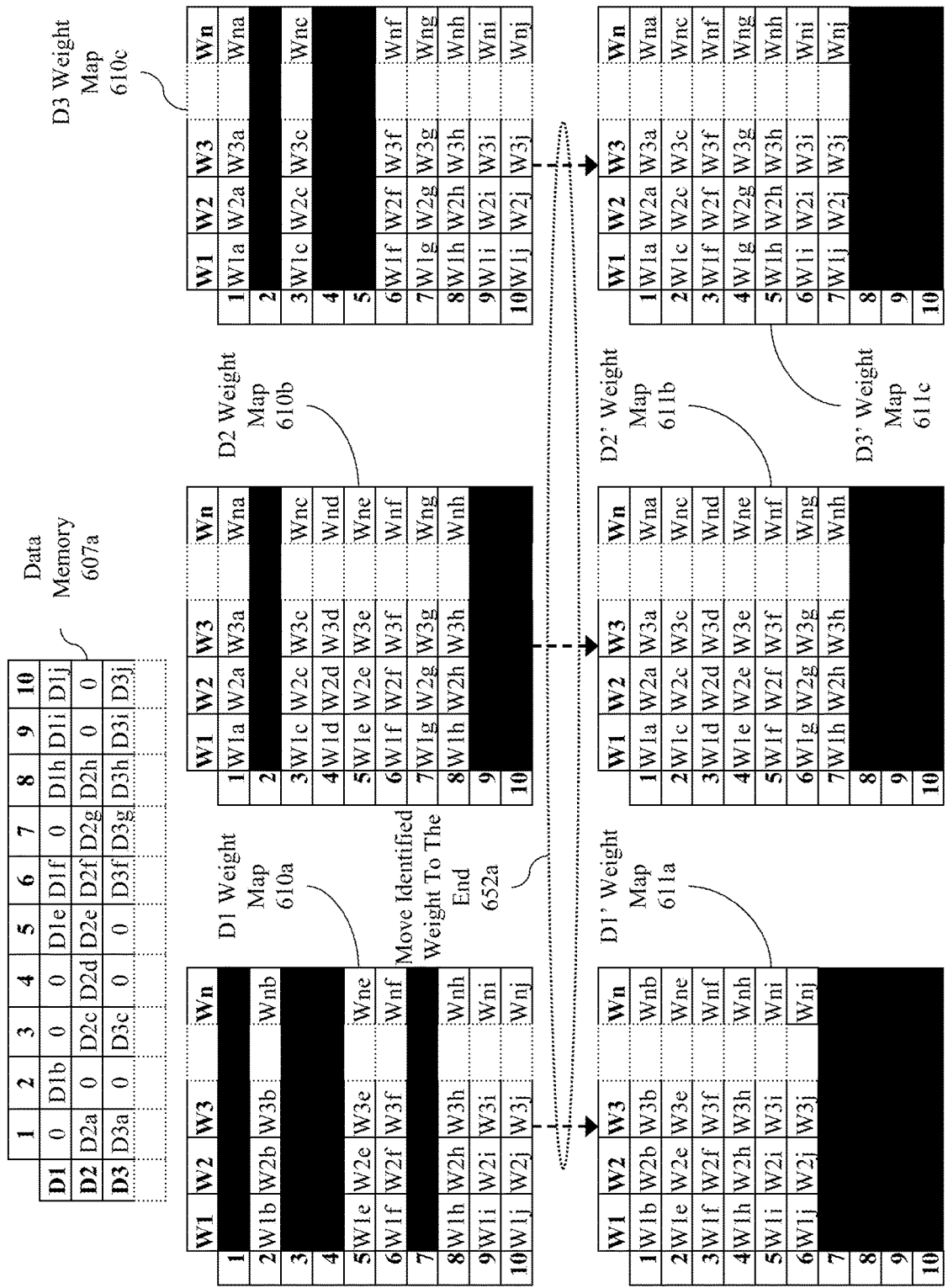

FIG. 6B provides a logical illustration of the corresponding rows of the weight map being moved to the end of the respective maps.

For each weight map, the corresponding rows are moved to the end of the weight map while the other rows are shifted up to take the place of the rows that are shifted down to the end. As discussed previously, the process could logically represent these movements of rows of weights or they could actually implement these movements.

D1 weight map 610*a* is modified to move the weights from rows 1, 3, 4, and 7 to the end of the weight map as illustrated by D1' weight map 611*a*. Similarly, D2 weight map 610*b* is modified to move the weights from row 2 to the end of the weight map as illustrated by D2' weight map 611*b*. However, as illustrated rows 9 and 10 are already at the end of the D2 weight map 610*b*. Finally, rows 2, 4, and 5 in weigh map 610*c* are moved to the end of the weight map as illustrated in D3' weight map 611*c*.

Figure 6C:
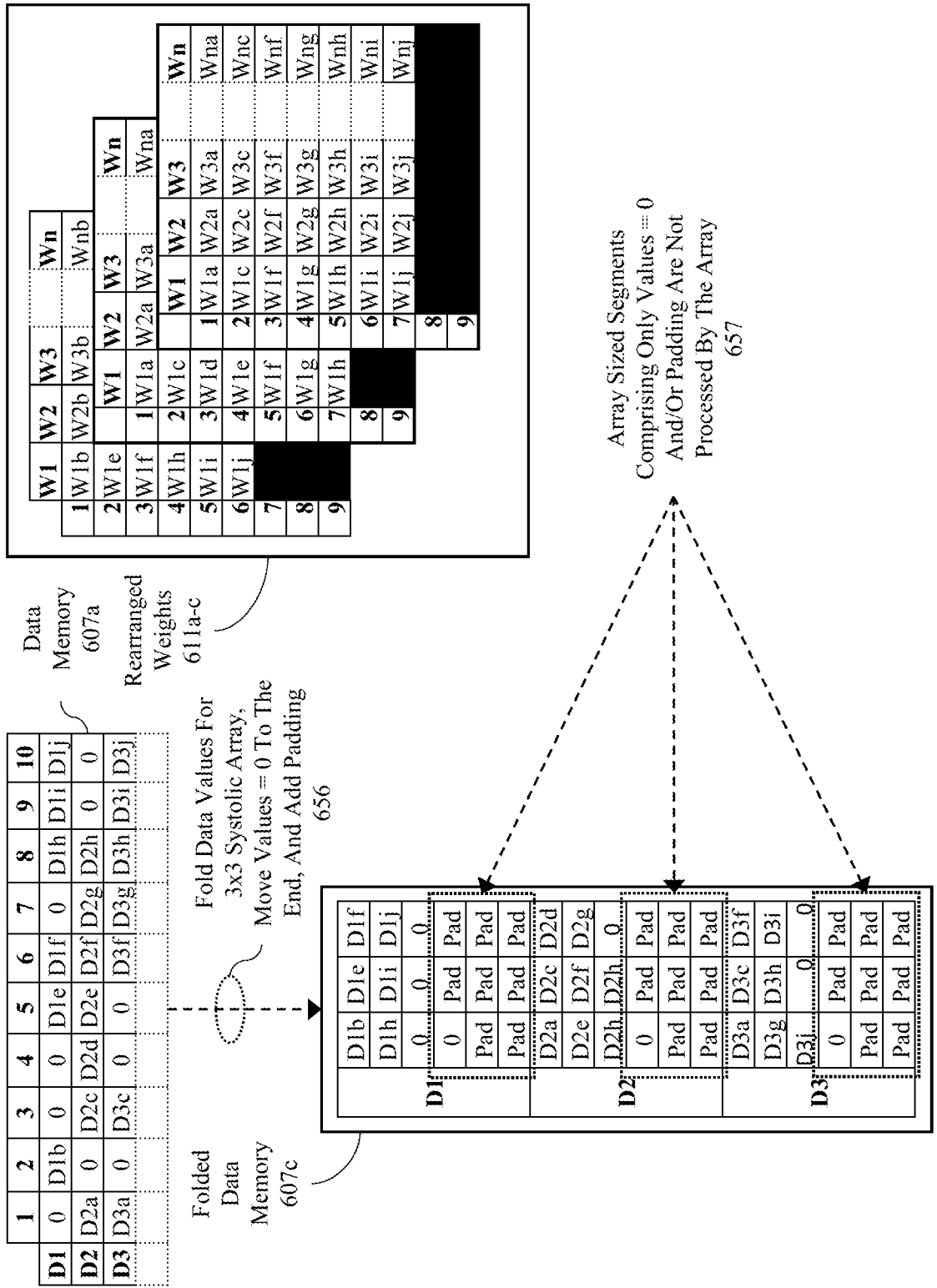

FIG. 6C illustrates the folding of the rows of data from the data matrix into folded data memory 607*c*. Folded data memory 607*c* corresponds to folded data memory 107*c* and thus the description of data memory 107*c* applies to 607*c*. As illustrated, the rearranged weights 611*a-c* have been moved into the upper righthand corner.

Each row comprises ten values while the systolic array comprising a 3×3 arrangement of processing elements. Thus, properly folded data will comprise up to 9 data values from a respective row in the data matrix. Because each row of data contains 10 values, each row will correspond to two sets of data or folds. In some embodiments, the second/last fold for each row will be padded to include either values equal to zero, a padding value, a stall, or no-op operation. For example, the row D1 is folded into a first set of data having the data values equal to zero moved to the end of the fold at 655. Because D1 comprises only 6 data values that are not equal to zero those data values are placed in the first part of the fold. The remainder of the fold contains three of the four data values equal to zero. Similarly, D2 is folded into a first set of data comprising 8 non-zero data values and one data value equal to zero, while D3 is folded into a first set of data comprising 7 non-zero data values and two data values equal to zero.

The second fold for each of D1, D2, and D3, comprise one data value equal to zero and 8 padding values. Because these folds contain only values equal to zero and/or padding values, these data folds do not need to be processed by the systolic array because they have no effect on the sum of a multiply and accumulate operation as indicated at 657. Thus, in the illustration presented here, the disclosed approach avoids processing 50% of the folds that would otherwise be processed in a normal flow for processing a machine learning job.

Figure 6D:
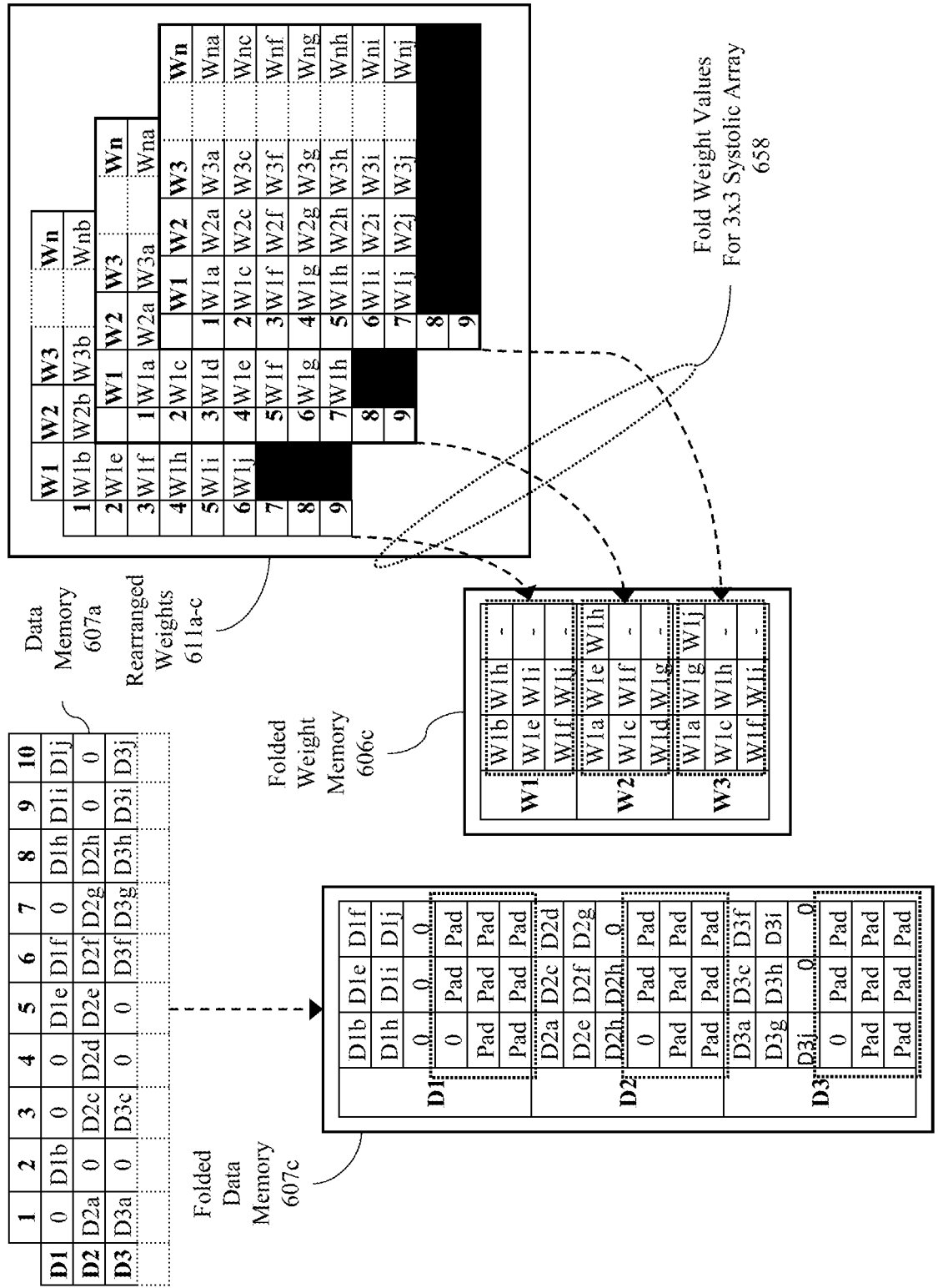

FIG. 6D illustrates the folding of the first column of weights in each of the rearranged weights 611a-c into folded weight memory 606c. Folded weight memory 606c corresponds to folded weight memory 106c and thus the description of weight memory 106c applies to 606c. Additionally, for context, data memory 607a and folded data memory 607c are provided as described previously.

Each weight matrix 611a-c includes 9 rows of weights with multiple columns. Logically, each column of weights might correspond to a different channel from other columns in a the same weight matrix. Here, we illustrate the folding of the weights in the first columns of each of rearranged weights 611a-c corresponding to a single channel for each row in the data memory 607a. Essentially, while the data folding process operates to divide a row into a plurality of rows having the same width as a target systolic array, the weight folding process operates to divide a column into a plurality of columns having the same depth as a target systolic array. Here the target systolic array has a 3×3 arrangement. Thus, the first three weights in a column will become a first column in a folded weight array, and each subsequent three weights will comprise a next column. This process will continue until all the weights in a column have been folded which may comprise one or multiple folds (see 658). As illustrated here, the maximum possible number of weights in a column is 9. Where the weight corresponds to a data value that is equal to zero we have inserted "-" to indicate that it does not matter what value is in this location. This could be one or more of the weights that have been moved or this could comprise zero or any other value. Thus, the weight folds corresponding to D1, D2, and D3, correspond to W1, W2, and W3.

Figure 7:
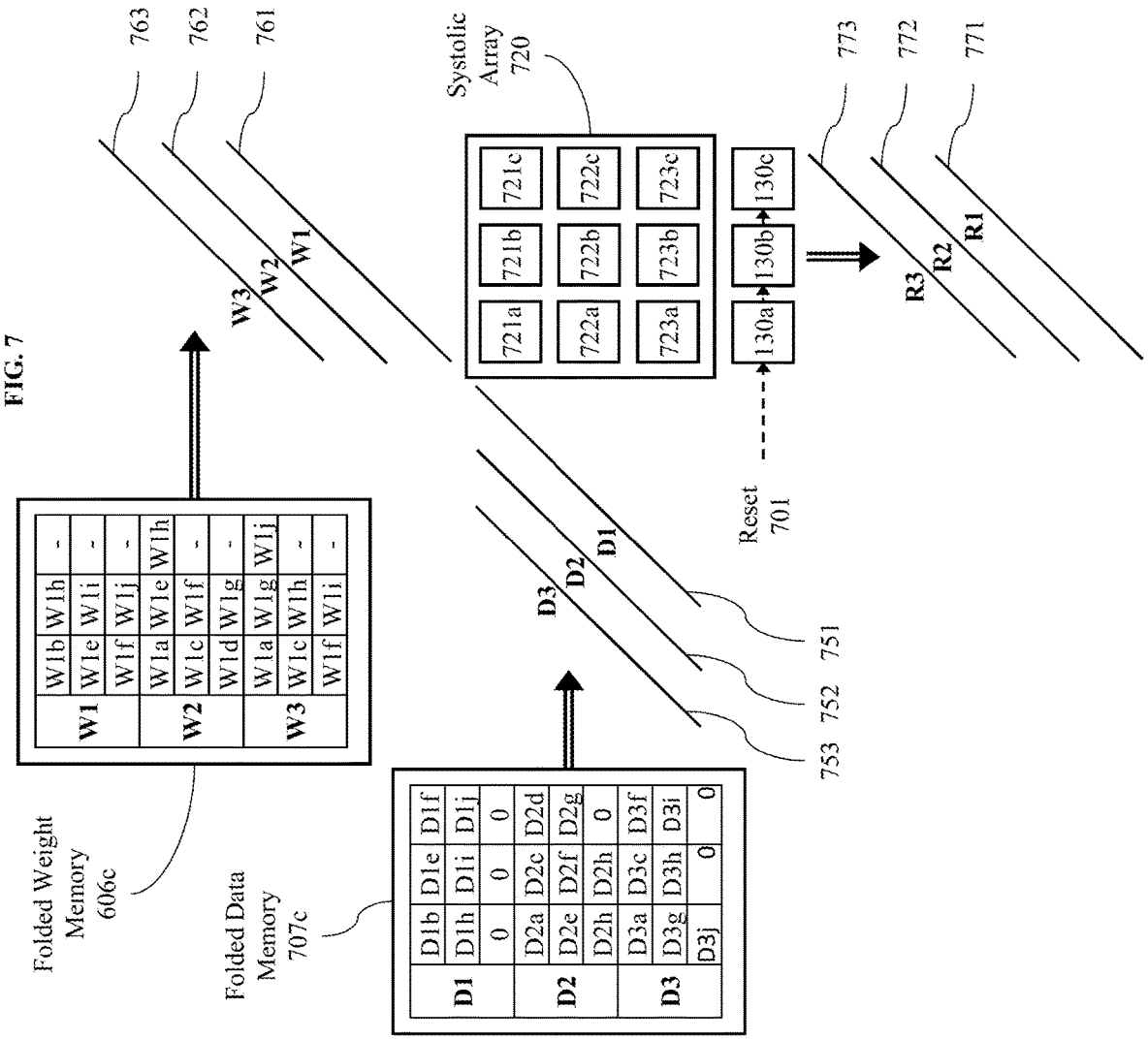
FIG. 7 provides an illustrative example for the flow of data into and out of a systolic array according to some embodiments.

FIG. 7 provides an illustrative example for the flow of data into and out of a systolic array according to some embodiments.

As illustrated here, the example provides folded weight memory 606c as previously discussed. Additionally, folded data memory 707c is illustrated as provided above with one modification. Specifically, folded data memory 707c does not illustrate the folds corresponding to only zero or padding values as those do not need to be processed and the omission of processing of these values provides an decrease in the amount of time required to complete processing in the approach disclosed herein. Furthermore, a systolic array 720 is provided that has the corresponding dimensions (3×3) to the folded data and weight memory.

The systolic array 720 comprises three rows and three columns of processing elements (721a-c, 722a-c, 723a-c). Data for each fold is input into the systolic array diagonally from the left, with the first value input at 721a and the last value input at 723a. Similarly, the corresponding weights are input diagonally from the top with the first weight being input at 721a and the last weight being input at 721c. As the input data is propagated through the array from the left to the right and the weights are propagated through the array from the top to the bottom. Additionally, as the values are propagated, were the data and weights intersect, they are multiplied and accumulated with a result (if any) from the processing element above. Because the data is input into the systolic array on the diagonal there may be data in the systolic array being operated on for multiple folds at once. Regardless, as data and corresponding weights are input into the systolic array at corresponding times. Thus, as data for D1 (see 751) is input into the array, weights W1 (see 761) are also input. Likewise, for D2 (see 752) and W2 (see 762), and D3 (see 753) and W3 (see 763).

The output of the systolic array 720 is accumulated at 130a-c. In the even that data for a row is only folded into a single fold then the accumulation structures merely captures the output at the correct time. In the event that a row of data is folded into multiple folds, the accumulation structures accumulate the result for the multiple folds. As illustrated here, the accumulation is managed using a reset signal. The signal is asserted prior to the first accumulation and then again when a next accumulation is started. Additionally, because the data and the is input into the systolic array diagonally, each accumulation structure in a adjacent row will have a single cycle offset. Thus, in a first cycle the reset 701 is asserted at 130a, at a second cycle the reset 701 is asserted at 130b, and in a third cycle the reset 701 is asserted at 130c. The reset will then be asserted in a similar pattern at a time corresponding to the processing a data from a subsequent fold. The results of this accumulation is output using the same diagonal offset timing relationship as illustrated by R1, R2, and R3, corresponding to 771, 772, and 773 respectively.

System Architecture Overview

Figure 8:
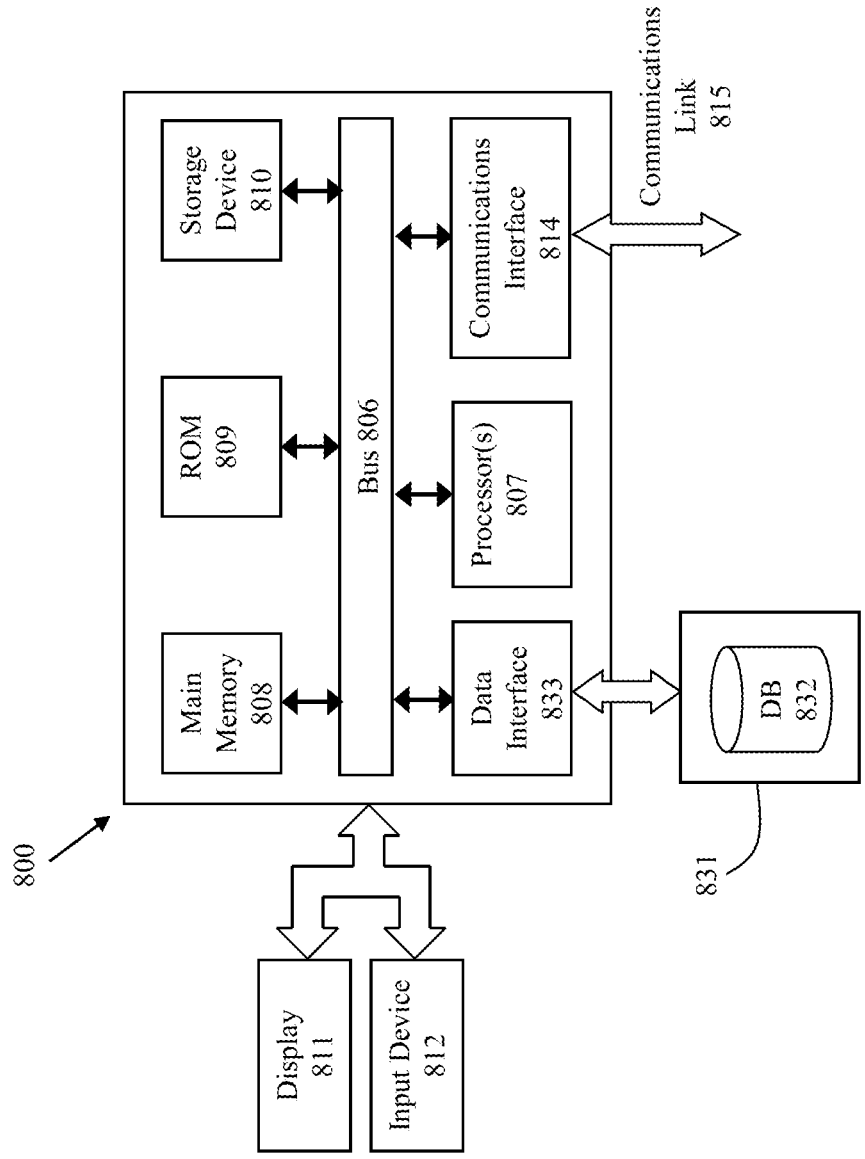
FIG. 8 shows an architecture of an example computing system with which the invention or parts of the invention may be implemented.

FIG. 8 shows an architecture of an example computing system with which the invention or parts of the invention may be implemented.

Computer system 800 includes a bus 806 or other communication mechanism for communicating information, which interconnects subsystems and devices, such as processor 807, system memory 808 (e.g., RAM), static storage device (e.g., ROM 809), storage device 810 (e.g., magnetic or optical disk drives), communication interface 814 (e.g., modem or Ethernet card), display 811 (e.g., CRT or LCD), input device 812 (e.g., keyboard), and cursor control.

According to one embodiment of the invention, computer system 800 performs specific operations by processor 807 executing one or more sequences of one or more instructions contained in system memory 808. Such instructions may be read into system memory 808 from another computer readable/usable medium, such as ROM 809 or storage device 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as storage device 810. Volatile media includes dynamic memory, such as system memory 808.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in storage device 810, or other non-volatile storage for later execution. Computer system 800 may communicate through a data interface 833 to a database 832 on an external storage device 831.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Thus, disclosed here is a multimodal systolic array that can be used to decrease the amounts of memory bandwidth required to fetch the data and weights by providing a systolic array that can reuse weights already stored in the systolic array. This lowers the bandwidth requirements for weight memory by allowing weights that have previously been read into the systolic array to be reused.

What is claimed is:

1. A machine learning apparatus, comprising: a data memory storing a data matrix; a load unit dynamically rearranging data in the data matrix associated with a machine learning processing job, by relocating sparse data in the data matrix, wherein
the sparse data within each respective row of the data matrix is moved to an end of the same respective row, and
the load unit dynamically generates, for each row of the data matrix having a respective sparse data value, a respective weight map by:
identifying one or more locations of any sparse data values in the respective row of the data matrix,
identifying, in a weight matrix, any rows corresponding to any of the one or more locations of any sparse data values in the respective row of the data matrix, and
generating a representation of the weight matrix where the rows corresponding to the one or more locations of any sparse data values in the data matrix are at the end of the representation; and
a systolic array having a plurality of processing elements, wherein the systolic array executes the machine learning processing job using the dynamically rearranged data, wherein at least some sparse data is not processed with the systolic array.

2. The machine learning apparatus of claim 1, further comprising a fold unit folding the dynamically rearranged data in the data matrix to fit the systolic array.

3. The machine learning apparatus of claim 1, wherein executing the machine learning process job comprises at least a plurality of multiply and accumulate operations.

4. The machine learning apparatus of claim 1, wherein the sparse data comprises data values equal to zero.

5. The machine learning apparatus of claim 2, wherein the fold unit folds a corresponding representation of the weight matrix to fit the systolic array.

6. The machine learning apparatus of claim 5, wherein at least one fold is identified as comprising only data values equal to zero and is not processed by performing a plurality of multiply and accumulate operations.

7. The machine learning apparatus of claim 1, wherein individual rows in the data matrix are processed using a plurality of columns of the weight matrix to generated respective results of multiple output channels.

8. The machine learning apparatus of claim 1, wherein at least some data is dynamically rearranging after execution of an activation function.

9. A method, comprising:
receiving a machine learning processing job;
storing a data matrix associated with the machine learning processing job in a data memory;
executing the machine learning processing job at least by dynamically rearranging data for the machine learning processing job to relocate sparse data on a row by row basis, dynamically rearranging data for the machine learning processing job to relocate sparse data on a row by row basis comprising:
relocating sparse data in the data matrix using a load unit, wherein
the sparse data within each respective row of the data matrix is moved to an end of the same respective row,
dynamically generating, by the load unit, for each row of the data matrix having a respective sparse data value, a respective weight map by:
identifying one or more locations of any sparse data values in the respective row of the data matrix,
identifying, in a weight matrix, any rows corresponding to any of the one or more locations of any sparse data values in the respective row of the data matrix, and
generating a representation of the weight matrix where the rows corresponding to the one or more locations of any sparse data values in the data matrix are at the end of the representation, and
wherein a systolic array having a plurality of processing elements executes the machine learning processing job using the dynamically rearranged data, and at least some sparse data is not processed with the systolic array; and
generating an output indicating whether the machine learning processing job was successful or failed.

10. The method of claim 9, wherein executing the machine learning processing job further comprises folding, using a fold unit, the dynamically rearranged data in the data matrix to fit the systolic array.

11. The method of claim 9, wherein executing the machine learning process job comprises at least a plurality of multiply and accumulate operations.

12. The method of claim 9, wherein the sparse data comprises data values equal to zero.

13. The method of claim 10, wherein executing the machine learning processing job further comprises folding, using the fold unit, a corresponding representation of the weight matrix to fit the systolic array.

14. The method of claim 13, wherein at least one fold is identified as comprising only data values equal to zero and is not processed by performing a plurality of multiply and accumulate operations.

15. The method of claim 9, wherein individual rows in the data matrix are processed using a plurality of columns of the weight matrix to generated respective results of multiple output channels.

16. The method of claim 9, wherein at least some data is dynamically rearranging after execution of an activation function.

17. A non-transitory computer readable medium, having stored thereon a set of configuration information for configuring a gate array or generating an application specific integrated circuit, the set of configuration information, when implemented performs a set of acts, the set of acts comprising:

receiving a machine learning processing job;

storing a data matrix associated with the machine learning processing job in a data memory;

executing the machine learning processing job on dynamically rearranged data comprising at least sparse data that is relocated in respective rows of the data matrix, by:

relocating sparse data in the data matrix using a load unit, wherein the sparse data within each respective row of the data matrix is moved to an end of the same respective row, dynamically generating, by the load unit, for each row of the data matrix having a respective sparse data value, a respective weight map by:

identifying one or more locations of any sparse data values in the respective row of the data matrix, identifying, in a weight matrix, any rows corresponding to any of the one or more locations of any sparse data values in the respective row of the data matrix, and generating a representation of the weight matrix where the rows corresponding to the one or more locations of any sparse data values in the data matrix are at the end of the representation, and wherein a systolic array having a plurality of processing elements executes the machine learning processing job using the dynamically rearranged data, and at least some sparse data is not processed with the systolic array; and generating an output indicating whether the machine learning processing job was successful or failed.

18. The computer readable medium of claim 17, wherein executing the machine learning processing job further comprises folding, using a fold unit, the dynamically rearranged data in the data matrix to fit the systolic array.

19. The computer readable medium of claim 17, wherein executing the machine learning process job comprises at least a plurality of multiply and accumulate operations.

20. The computer readable medium of claim 17, wherein the sparse data comprises data values equal to zero.

21. The computer readable medium of claim 18, wherein executing the machine learning processing job further comprises folding, using the fold unit, a corresponding representation of the weight matrix to fit the systolic array.

22. The computer readable medium of claim 21, wherein at least one fold is identified as comprising only data values equal to zero and is not processed by performing a plurality of multiply and accumulate operations.

23. The computer readable medium of claim 17, wherein individual rows in the data matrix are processed using a plurality of columns of the weight matrix to generated respective results of multiple output channels.

24. The computer readable medium of claim 17, wherein at least some data is dynamically rearranging after execution of an activation function.

* * * * *